US012498435B2

(12) United States Patent
Yang et al.

(10) Patent No.: US 12,498,435 B2
(45) Date of Patent: Dec. 16, 2025

(54) MULTI-TURN BIRDCAGE MRI COIL AND APPLICATIONS

(71) Applicant: Quality Electrodynamics, LLC, Mayfield Village, OH (US)

(72) Inventors: Xiaoyu Yang, Indiana, PA (US); Matthew Finnerty, University Heights, OH (US); Tsinghua Zheng, Chesterland, OH (US); Thomas Eastlake, Cleveland, OH (US)

(73) Assignee: Quality Electrodynamics, LLC, Mayfield Village, OH (US)

( * ) Notice: Subject to any disclaimer, the term of this patent is extended or adjusted under 35 U.S.C. 154(b) by 185 days.

(21) Appl. No.: 18/461,810

(22) Filed: Sep. 6, 2023

(65) Prior Publication Data

US 2024/0094317 A1 Mar. 21, 2024

Related U.S. Application Data

(60) Provisional application No. 63/404,556, filed on Sep. 8, 2022.

(51) Int. Cl.
*G01R 33/34* (2006.01)

(52) U.S. Cl.
CPC .............................. *G01R 33/34076* (2013.01)

(58) Field of Classification Search
CPC ................................................ G01R 33/34076
USPC .......................................................... 324/318
See application file for complete search history.

(56) References Cited

U.S. PATENT DOCUMENTS 4,692,705 A 9/1987 Hayes
4,825,162 A 4/1989 Roemer et al.
7,227,360 B2 * 6/2007 Jevtic ................. G01R 33/3415 324/318
7,633,293 B2 * 12/2009 Olson .............. G01R 33/34046 324/318
8,680,863 B1 3/2014 Qian et al.
2007/0285096 A1 * 12/2007 Soutome .......... G01R 33/34076 324/318

(Continued)

FOREIGN PATENT DOCUMENTS

WO WO-2023092700 A1 * 6/2023 ............. G01R 33/36

OTHER PUBLICATIONS

Li et. al; Translation of WO 2023092700 A1, Pub. Date Jun. 1, 2023; Translated by Clarivate Analytics (Year: 2023).*

(Continued)

*Primary Examiner* — Eman A Alkafawi
*Assistant Examiner* — Rahul Maini
(74) *Attorney, Agent, or Firm* — Eschweiler & Potashnik, LLC

(57) ABSTRACT

In some embodiments, the present disclosure relates to a multi-turn (MT) birdcage magnetic resonance imaging (MRI) radio-frequency (RF) coil. The MT birdcage MRI RF coil includes a first conductive ring, a second conductive ring, and a plurality of conductive rungs. Each of the plurality of conductive rungs includes a first end coupled to the first conductive ring, and a second end coupled to the second conductive ring. At least one of the first conductive ring and the second conductive ring includes more than one turn. The first conductive ring, the second conductive ring, and the plurality of conductive rungs form a plurality of meshes.

20 Claims, 14 Drawing Sheets

200
201A
201B
202A
202B
204A
204B
206A
206B
212A
212B
212C
212D
212E
212F
212G
212H

(56) References Cited

U.S. PATENT DOCUMENTS

| | | | | |
|---|---|---|---|---|
| 2009/0251145 | A1* | 10/2009 | Kaneko | G01R 33/34076 324/318 |
| 2010/0182009 | A1* | 7/2010 | Crozier | A61B 5/055 324/322 |
| 2021/0132169 | A1* | 5/2021 | Yang | G01R 33/34076 |

OTHER PUBLICATIONS

Tropp, James. "The Hybrid Bird Cage Resonator." Proceedings of the 11th Annual Meeting of SMRM, Berlin, Germany, p. 4009, published in 1992.

Alagappan et al. "Degenerate Mode Band-Pass Birdcage Coil for Accelerated Parallel Excitation" Magnetic Resonance in Medicine 57:1148-1158, published in 2007.

Cheng et al. "A degeneracy study in the circulant and bordered-circulant approach to birdcage and planar coils" Magma (2003) 16:103-111, DOI 10.1007/s10334-003-0009-5, published on Jul. 25, 2003.

* cited by examiner

MULTI-TURN BIRDCAGE MRI COIL AND APPLICATIONS

REFERENCE TO RELATED APPLICATION

This application claims the benefit of U.S. Provisional Application No. 63/404,556, filed on Sep. 8, 2022, the contents of which are hereby incorporated herein by reference in their entirety.

BACKGROUND

Magnetic resonance imaging (MRI) involves the transmission and receipt of radio frequency (RF) energy. RF energy may be transmitted by an RF coil to create a $B_1$ field that rotates a net magnetization. Further, resulting magnetic resonance (MR) signals may be received by an RF coil to detect precessing transverse magnetization. Thus, RF coils may be transmit (Tx) coils, receive (Rx) coils, or transmit and receive (Tx/Rx) coils.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. It is further noted that the examples portrayed in the figures should not be considered as the only embodiments covered by the present disclosure.

DETAILED DESCRIPTION

Figure 1:
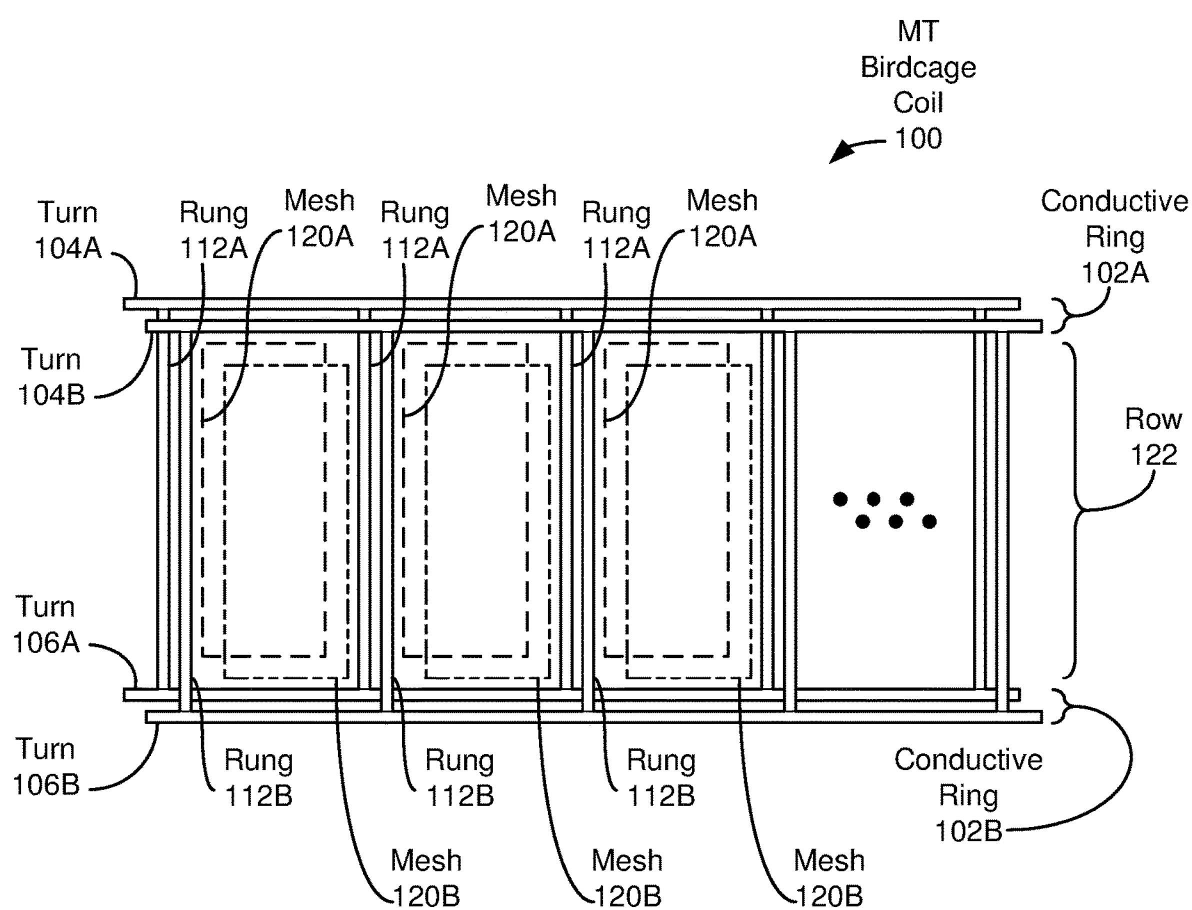
FIG. 1 illustrates a schematic view of some embodiments of a multi-turn (MT) MRI RF birdcage coil.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purposes of simplicity and clarity and does not in itself dictate a relationship between the various embodiments and/or configurations discussed.

Further, spatially relative terms, such as “beneath,” “below,” “lower,” “above,” “upper,” “lower,” and the like, may be used herein for ease of description to describe one element or feature’s relationship to one or more other elements or features as illustrated in the figures. The spatially relative terms are intended to encompass different orientations of the device in use or operation in addition to the orientation depicted in the figures. The apparatus may be otherwise oriented (e.g., rotated 90 degrees or at other orientations), and the spatially relative descriptors used herein may likewise be interpreted accordingly.

Since its introduction in 1983, the birdcage coil has become the most popular magnetic resonance imaging (MRI) transmit (Tx) coil in horizontal MRI systems because of its excellent $B_1$ field uniformity. Generally, a birdcage coil may be cylindrical in shape, with a pair of conductive end “rings” joined by a plurality of conductive “rungs”, with each pair of adjacent rungs forming a loop or “mesh” with the intervening portions or segments of the rings. Examples include a system built-in whole-body coil (WBC) and many local cylindrical-like Tx/receive (Rx) coils, such as head coils, knee coils, wrist coils, etc. Birdcage coil types include high-pass, low-pass, and band-pass coils. The birdcage coil can also be used as an Rx coil because any Tx coil may generally be employed as an Rx coil.

The birdcage coil may be used in association with field strengths ranging from very low (e.g., less than 0.1 Tesla (T)) to very high (e.g., 7 T or more). Further, the birdcage coil can be used with or without a radio frequency (RF) shield, depending on the application. For example, if a birdcage coil is used as a WBC, an RF shield may surround the WBC and may be separated therefrom by a gap in the radial direction. The gap, for example, may be several centimeters (cm) (e.g., about 2-3 cm) in width.

Aside from the aforementioned use of the birdcage coil as a volume coil, the birdcage coil may also be used as a degenerate birdcage coil. A degenerate birdcage coil, in some examples, may be a band-pass birdcage coil in which ring and rung capacitor values are chosen so that all resonant modes of the band-pass birdcage coil collapse at the same frequency. Hence, the degenerate birdcage coil is a birdcage coil operating in a degenerate mode and may be regarded as an all-modes-in-one birdcage coil. When all resonant modes collapse, each mesh of the birdcage coil may be used as an independent loop coil because all meshes of such a birdcage coil exhibit excellent intrinsic isolation among themselves. This unique property is especially suited for parallel imaging, both in Tx mode (e.g., as a parallel Tx (pTx) coil) and in Rx mode (e.g., as an RF phased array coil).

The birdcage coil as described above presents various challenges in some applications. A first such application is a low-field application (e.g., less than 1 T). If the same high-pass or low-pass birdcage coil is used at low magnetic fields, the impedance from the same inductance becomes smaller. As a result, the coil quality factor, or "Q", which refers to the efficiency of the coil in minimizing signal loss induced by the patient anatomy, may decrease. Generally, a higher Q favorably results in a higher signal-to-noise ratio (SNR). Furthermore, the capacitor values used in the birdcage coil may become exceptionally large because the resonance frequency $f_0$, coil inductor L, and coil capacitor C satisfy Eq. 1:

$$f_0 = \frac{1}{2\pi\sqrt{LC}} \quad \text{Eq. 1}$$

To illustrate, suppose a 16-rung high-pass WBC at 1.5 T uses 100 picofarad (pF) capacitors located at the end rings for each mesh. If the $B_0$ field is decreased from 1.5 T to 0.5 T while keeping all other configurations unchanged (e.g., rung width, ring width, number of rungs, WBC diameter, RF shield, etc.), then the capacitor values should be changed from 100 pF to 900 pF, which creates several difficulties. For one, such a large value capacitor typically possesses a lower capacitor Q. The quality factor "Q" for a capacitor is generally considered to be the ratio of its reactance to its resistance at a given frequency. Consequently, the higher the Q factor, the more closely the capacitor behaves in an ideal manner. Secondly, the coil may depend on much larger tuning range capacitors to tune a 900 pF capacitor if the birdcage coil is to be tunable for other component tolerances. Further, large tuning range capacitors are more expensive and physically larger. Therefore, an improved solution for low-field applications is desirable.

A second application in which challenges arise is when the birdcage coil serves as a pTx or Rx array coil. As discussed earlier, the degenerate birdcage coil exhibits excellent intrinsic isolation among meshes, which makes the coil a good solution for pTx and Rx array coils. However, a difficulty with using the birdcage coil in such an application is that the birdcage coil only has one row, while pTx or Rx array coils may depend on the use of more than one row to achieve $B_0$ field direction acceleration and $B_1$ field uniformity manipulation. This $B_0$ direction acceleration is important for 7 T and above applications due to the electromagnetic (EM) field wavelength being short inside human anatomies. While it is possible to use two or more birdcage coils along the $B_0$ direction, the coupling between two such birdcage coils (e.g., the coupling between the adjacent end rings of the two coils) remains a significant challenge.

To address the challenges noted above, the present disclosure is directed towards a multi-turn (MT) birdcage MRI RF coil (or, alternatively, an MT birdcage coil) in conjunction with an MRI apparatus or system to create a diagnostic image of a region of interest of a patient (e.g., human or other animal) anatomy. While dual-tuned birdcage coils and the like may use multiple rings, the MT birdcage coil of the present disclosure operates at a single frequency and has two rings. Further, in some embodiments, each ring may cover more than one row using multiple revolutions, or "turns", and transitions may exist between rows (e.g., adjacent rows may be offset, may include different numbers of meshes, and so on).

As a result of at least some embodiments, an MT birdcage coil may provide a higher Q than previously attained in low-field applications, and may also provide multiple rows of meshes for $B_0$ field direction acceleration and $B_1$ field uniformity manipulation that may be desired in high-field applications, as indicated above.

FIG. 1 illustrates a schematic view of some embodiments of an MT birdcage coil 100. As shown, the MT birdcage coil 100 includes a first conductive ring 102A and a second conductive ring 102B. Each of the conductive rings 102A and 102B includes two revolutions, or "turns". More specifically, the first conductive ring 102A includes a first turn 104A and a second turn 104B, and the second conductive ring 102B includes a first turn 106A and a second turn 106B. In other embodiments, only one of the conductive rings 102A and 102B may include multiple turns. In yet other embodiments, one or both of the conductive rings 102A and 102B may have more than two turns. As described more fully below, regardless of the number of turns, each of the conductive rings 102A and 102B forms a single closed ring or path.

In some embodiments, connecting the first conductive ring 102A and the second conductive ring 102B are a plurality of conductive rungs 112A and 112B. In some embodiments, each consecutive pair of adjacent rungs 112A and 112B form a loop or "mesh" with portions or segments of the rings 102A and 102B located therebetween. For example, as shown in FIG. 1, rungs 112A, with first turn 104A and first turn 106A, form meshes 120A, and rungs 112B, with second turn 104B and second turn 106B, form meshes 120B. In some embodiments, meshes 120A overlap meshes 120B and are thus aligned in a single row 122. In other embodiments described below, more than one row of non-overlapping meshes may be provided.

Also, as described in greater detail below, embodiments of the MT birdcage coil 100 may be employed in low-field and/or high-field applications as a WBC, a pTx array coil, an Rx array coil, and/or other MRI coils.

Figure 2A:
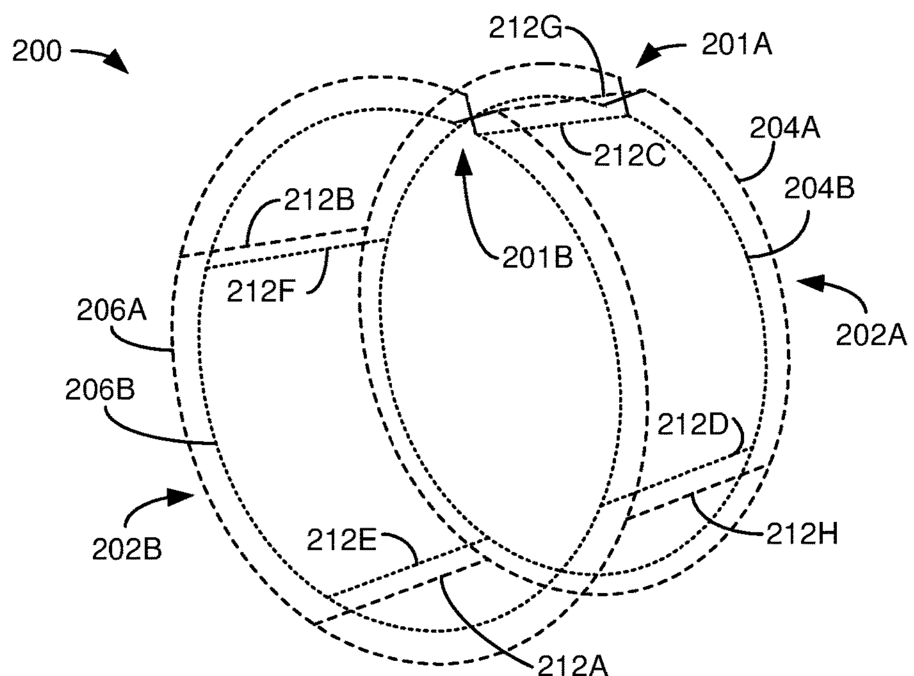
FIGS. 2A and 2B illustrate three-dimensional (3D) and two-dimensional (2D) views, respectively, of some embodiments of an eight-rung, one-row MT birdcage coil in which each of a first conductive ring and a second conductive ring has two turns.
Figure 2B:
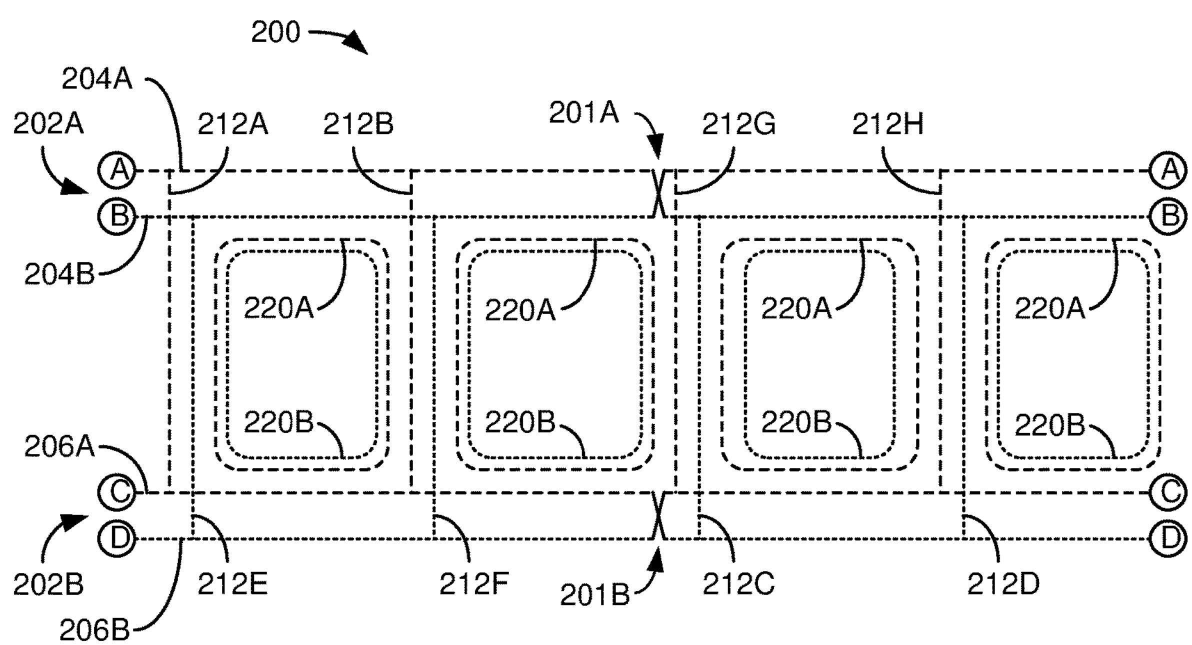

FIGS. 2A and 2B illustrate various views of some embodiments of an eight-rung, one-row MT birdcage coil 200 with two turns. FIG. 2A illustrates a perspective, three-dimensional (3D) view of the MT birdcage coil 200, whereas FIG. 2B illustrates a flattened, two-dimensional (2D) view of the MT birdcage coil 200. For simplicity, FIGS. 2A and 2B do not show any capacitors at the rings and rungs of the MT birdcage coil 200. However, the MT birdcage coil 200 can be used as a high-pass, low-pass, or band-pass birdcage coil using such capacitors in some embodiments.

The MT birdcage coil 200 includes two conductive rings 202A and 202B, each of which circles a cylinder described by the MT birdcage coil 200 twice before repeating, resulting in a first closed conductive ring 202A including a first turn 204A and a second turn 204B and a second closed conductive ring 202B including a first turn 206A and a second turn 206B. To form a complete ring, conductive ring 202A includes a transition or crossover 201A between turns

204A and 204B, and conductive ring 202B includes a transition or crossover 201B between turns 204A and 204B. Additionally, the two ring segments of conductive ring 202A at crossover 201A do not directly connect to each other, and the two ring segments of conductive ring 202B at crossover 201B also do not electrically connect each other.

Also, as illustrated in FIG. 2A, conductive rings 202A and 202B are joined by a plurality of conductive rungs 212A through 212H. More specifically, rungs 212A, 212B, 212G, and 212H join first turn 204A of conductive ring 202A and first turn 206A of conductive ring 202B. Further, rungs 212C, 212D, 212E, and 212F join second turn 204B of conductive ring 202A and second turn 206B of conductive ring 202B.

To facilitate the 2D view of FIG. 2B, the connection between turns 204A and 204B of conductive ring 202A and between turns 206A and 206B of conductive ring 202B are designated by the letters A, B, C, and D at the left and right ends of FIG. 2B. More specifically, two ends of one line with the same letter designation indicate that those ends join each other, such as A-A, B-B, C-C, and D-D. Consequently, starting at the left-hand point A, first turn 204A of conductive ring 202A progresses to the right, transitions at crossover 201A to second turn 204B, proceeds to right-hand point B, continues at left-hand point B, continues to crossover 201A, transitions back to first turn 204A, proceeds to right-hand point A, and thus returns to the start at left-hand point A, thereby providing a continuous conductive ring 202A with two turns 204A and 204B. Similarly, points C and D indicate how turns 206A and 206B of conductive ring 202B are connected. Further, as discussed above, crossovers 201A and 201B indicate the locations at which the conductive rings 202A and 202B transition from one turn to another to form a continuous ring. Thus, the segments shown at each of crossovers 201A and 201B do not electrically connect, but are instead spaced apart by some distance at that location.

In view of the structure of the MT birdcage coil 200, the rings 202A and 202B and the rungs 212A-212G form eight meshes: four meshes 220A associated with first turns 204A and 206A, and four meshes 220B associated with second turns 204B and 206B. Further, each first mesh 220A overlaps a corresponding mesh 220B, thus providing a single row of meshes 220A and 220B.

An analysis of the resonant modes of this eight-rung, one-row MT birdcage coil 200 is provided below using a periodical condition method. For this method, RF resonances are assumed to exist. Thus, an RF current flows in each rung 212A-212H. Further, assume the current flow in rung 212A has a phase of 0 degrees. Due to symmetry and periodical conditions, an equal phase increment exists between adjacent rungs and the phase at the same rung is an integer multiple of 360 degrees after going through two turns. For example, the phase of rung 212A changes 360 degrees*N after the two turns, where N is a non-zero integer. In addition, beginning with rung 212A, following the turns of the conductive rings 202A and 202B, the order of the rungs is rung 212A, rung 212B, rung 212C, rung 212D, rung 212E, rung 212F, rung 212G, and rung 212H.

With the periodical condition method, each rung's phase can be listed for different 360 degree*N modes and the modes can be studied. The phase results are provided in Table 1 below. Note that the phases inside parentheses are the original phases and the phases above the original phases are the same phases converted back to the range between 0 degrees and 360 degrees.

TABLE 1

Mode Study Results Using Rung Current Phase

| Phase Change After Two Turns (deg) | Rung 212A Phase (deg) | Rung 212E Phase (deg) | Rung 212B Phase (deg) | Rung 212F Phase (deg) | Rung 212C Phase (deg) | Rung 212G Phase (deg) | Rung 212D Phase (deg) | Rung 212H Phase (deg) |
|---|---|---|---|---|---|---|---|---|
| 360*0 | 0 | 0 | 0 | 0 | 0 | 0 | 0 | 0 |
| 360*1 | 0 | 180 | 45 | 225 | 90 | 270 | 135 | 315 |
| 360*2 | 0 | 0 (360) | 90 | 90 (450) | 180 | 180 (540) | 270 | 270 (630) |
| 360*3 | 0 | 180 (540) | 135 | 315 (675) | 270 | 90 (810) | 45 (405) | 225 (945) |
| 360*4 | 0 | 0 (720) | 180 | 180 (900) | 0 (360) | 0 (1080) | 180 (540) | 180 (1260) |
| 360*5 | 0 | 180 (900) | 225 | 45 (1125) | 90 (450) | 270 (1350) | 315 (675) | 135 (1575) |
| 360*6 | 0 | 0 (1080) | 270 | 270 (1350) | 180 (540) | 180 (1620) | 90 (810) | 90 (1890) |
| 360*7 | 0 | 180 (1260) | 315 | 135 (1575) | 270 (630) | 90 (1890) | 225 (945) | 45 (2205) |
| 360*8 | 0 | 0 (1440) | 0 (360) | 0 (1800) | 0 (720) | 0 (2160) | 0 (1080) | 0 (2520) |

As seen in Table 1, the eight-rung, one-row MT birdcage coil 200 has only eight unique current phase patterns (e.g., N=0, 1, 2, 3, . . . , 7), as N=8 has the same phase pattern as N=0 and the phase patterns repeat when N=9, 10, 11, etc. Consequently, the MT birdcage coil 200 possesses eight resonant modes.

The MT birdcage coil 200 also exhibits a special degenerate situation in which at least two modes possess the same frequency, whereas other modes may possess different frequencies. If two rungs are at the same location or close thereto (e.g., rung 212A and rung 212E; rung 212B and rung 212F; and so on), the phases of those rungs are opposite for the N=1 mode (e.g., there is no net current in rungs) and the N=1 mode and the N=0 mode have the same current pattern (e.g., the frequencies of N=1 and N=0 are the same frequency). However, this special degenerate situation is not present if corresponding rungs associated with different turns are far from each other, regardless of whether the rungs are equally spaced or unequally spaced. In that case, the total equivalent rung current at each rung area is not zero and is instead a sum of different layer rung currents (e.g., N=0 and N=1 have different current patterns). Note that the number of ring turns can be extended from two to three and above, but the degenerate situation cannot exist if the number of ring turns is an odd number and not an even number, as the rung currents may not cancel each other at each position in space otherwise.

Both first conductive ring 202A and second conductive ring 202B have two turns in FIGS. 2A and 2B, and thus MT birdcage coil 200 may support resonant modes. However, the conductive rings 202A and 202B need not possess the same number of turns for the MT one-row birdcage coil to support resonant modes. In some embodiments, the particular resonant modes and the number of resonant modes may be different for various equal-turn cases. A detailed mode analysis can be performed using the periodical condition method described above with regard to Table 1.

Figure 3A:
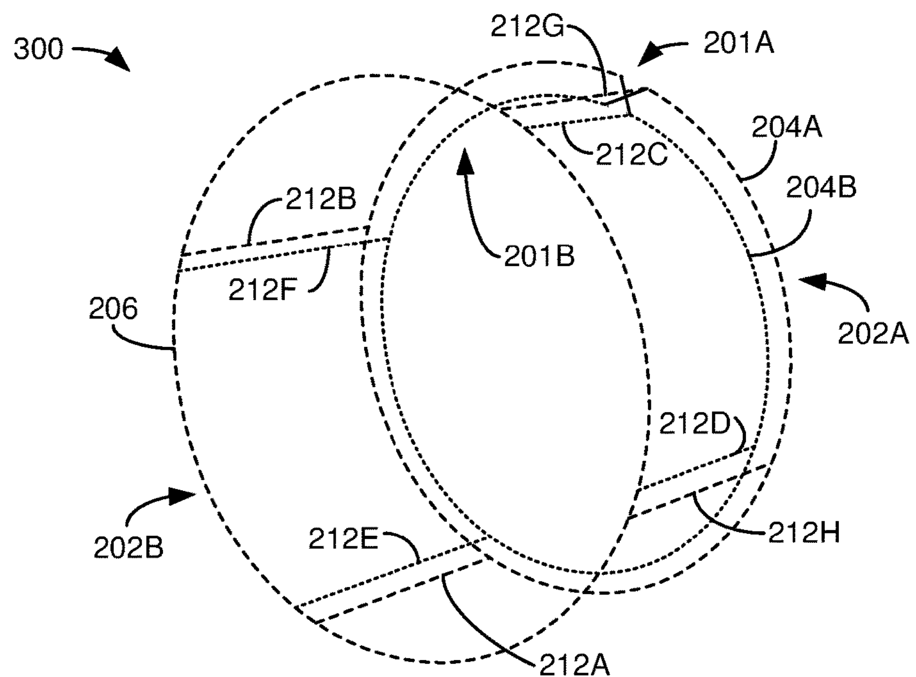
FIGS. 3A and 3B illustrate 3D and 2D views, respectively, of some embodiments of an eight-rung, one-row MT birdcage coil in which a first conductive ring has two turns and a second conductive ring has one turn.
Figure 3B:
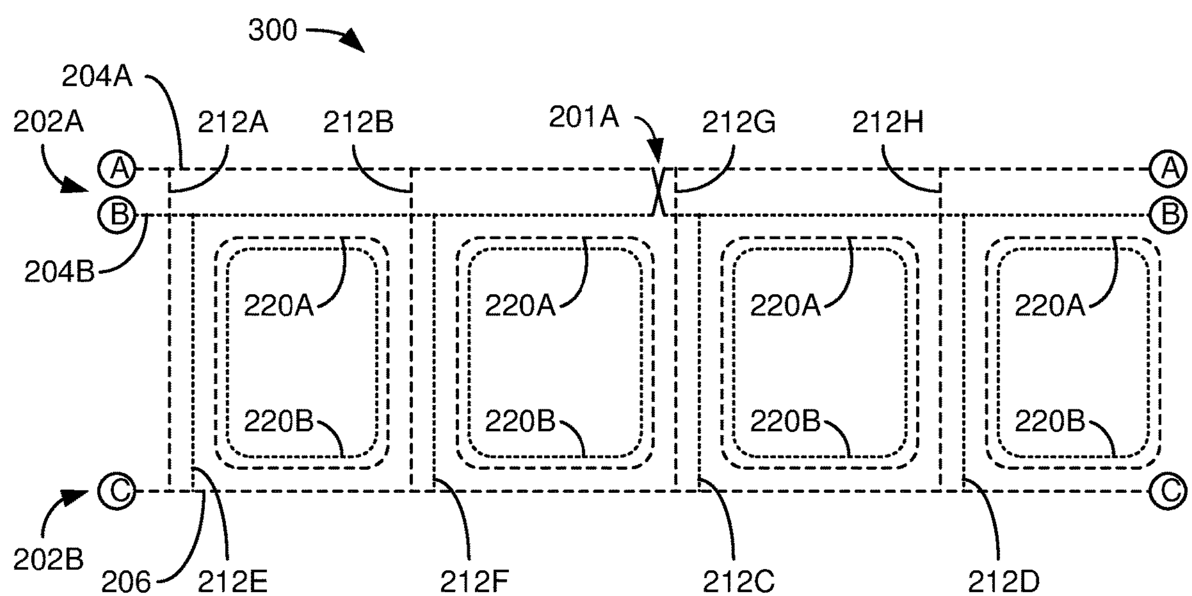

FIGS. 3A and 3B illustrate a 3D view and a 2D view, respectively, of some embodiments of an eight-rung, one-row MT birdcage coil 300 in which first conductive ring 202A has a first turn 204A and a second turn 204B and second conductive ring 202B has a single turn 206. Consequently, all rungs 212A-212H electrically connect to the single turn 206.

Several benefits may be provided by the MT one-row birdcage coils discussed above (e.g., MT birdcage coil 200 of FIGS. 2A and 2B and MT birdcage coil 300 of FIGS. 3A and 3B). A first benefit is a higher coil Q. For example, a higher-number-of-turn solenoid coil has a higher coil Q because the inductance of the solenoid is ~N^2, while the resistance of the solenoid is ~N, where N is the number of turns. The MT one-row birdcage coils discussed above exhibit a similar Q improvement as the solenoid coil when the number of turns increase. Such benefit may be important when the magnetic field $B_0$ decreases for low-field MRI (e.g., <1 T) because the noise of an RF coil is coil-dominant at low-field MRI. An immediate application of this technology is a Tx/Rx birdcage coil in horizontal, low-field MR systems, such as a WBC and a local Tx/Rx coil (e.g., a Tx/Rx coil for the head, knee, etc. of a patient).

A second benefit may be easier tuning of the MT one-row birdcage coil. Variable capacitors may be used to tune a birdcage coil. However, due to limitations in voltage rating and capacitor size, the variable capacitor tuning range is may be less than 100 pF. The capacitor value for a conductive end ring of a high-pass birdcage coil at a low field can be very large. For example, a 32-rung high-pass WBC may have end ring capacitor values around 2000 pF at 24 MHz. Accordingly, if a 100 pF variable capacitor is used on the end ring for tuning the WBC (e.g. to address the tolerance of the coil and all other components), the resulting frequency tuning range is extremely small. Further, to increase the frequency tuning range, more variable capacitors may be added, thus creating a serious cost increase.

The MT one-row birdcage coils 200 and 300 can increase the frequency tuning range and reduce the number of variable capacitors compared to the one-turn birdcage coil. A first reason for this larger frequency tuning is that mesh inductance increases in response to a larger mesh. For example, the two-turn, one-row, 32-rung birdcage mesh is twice the size of a one-turn, one-row, 32-rung birdcage mesh. A second reason is that the second turn meshes 220B overlap (e.g., are on top of) the first turn meshes 220A. The mutual inductance between the overlapping meshes increases their inductance further. This inductance boost mechanism is similar to that provided by a solenoid. Therefore, the coil inductance of the MT one-row birdcage coil is significantly larger than the traditional one-turn birdcage coil. As a result, the end ring capacitor values of the MT one-row birdcage coil may be much smaller or may render the frequency tuning range larger if the same variable capacitors associated with a one-turn birdcage coil are used.

Figure 4A:
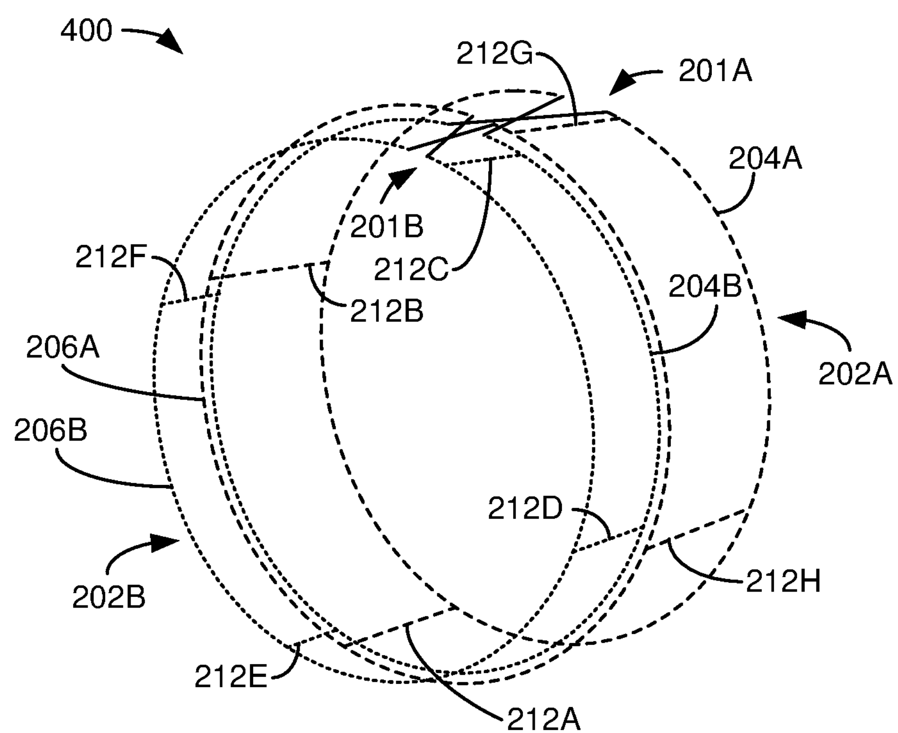
FIGS. 4A and 4B illustrate 3D and 2D views, respectively, of some embodiments of a two-turn, eight-rung, two-row MT birdcage coil.
Figure 4B:
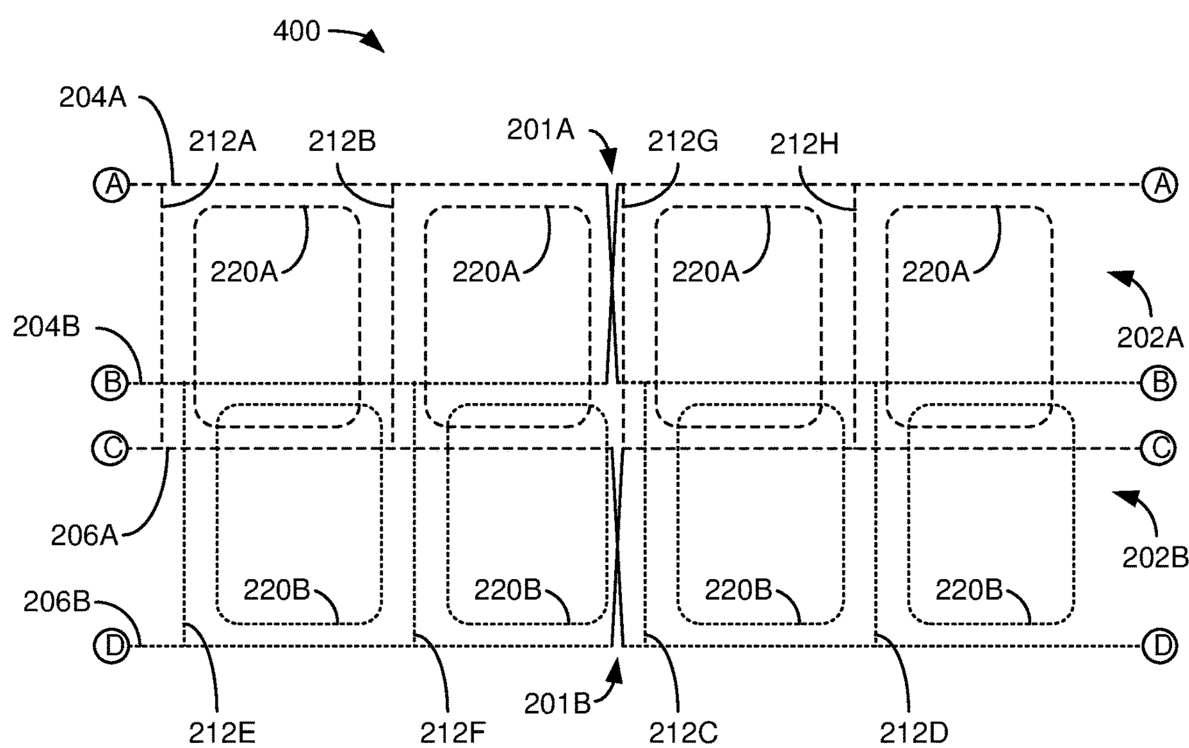

Additional embodiments of the MT birdcage coil pertain to situations in which the MT birdcage coil has more than one row. For example, FIGS. 4A and 4B illustrate 3D and 2D views, respectively, of some embodiments of a two-turn, eight-rung, two-row MT birdcage coil 400. In a manner similar to that employed in FIGS. 2B and 3B, points A, B, C, and D of FIG. 4B represent joint points for conductive rings 202A and 202B. For example, starting at the left-hand point A, first turn 204A of conductive ring 202A progresses to the right, transitions at crossover 201A to second turn 204B, proceeds to right-hand point B, continues at left-hand point B, continues to crossover 201A, transitions back to first turn 204A, proceeds to right-hand point A, and thus returns to the start at left-hand point A, thereby providing a continuous conductive ring 202A with two turns 204A and 204B. Similarly, points C and D indicate how turns 206A and 206B of conductive ring 202B are connected.

In some embodiments, as shown in FIGS. 4A and 4B, the first turn 204A and the second turn 204B of conductive ring 202A are somewhat separated in distance, as are the first turn 206A and the second turn 206B of conductive ring 202B. This separation facilitates the forming of the two rows of meshes: a first (upper) row of meshes 220A and second (lower) row of meshes 220B. Consequently, crossovers 201A and 201B, as shown in FIGS. 4A and 4B, may employ non-cross-connecting segments of the first conductive ring 202A and the second conductive ring 202B, respectively, that are longer than those indicated in FIGS. 2A, 2B, 3A, and 3B.

The mode analysis for this MT two-row birdcage coil 400 can be performed using the same aforementioned periodical condition method. Among all modes, the N=2 mode is discussed hereafter because it is a uniform mode that can be used for Tx-mode operation. For the N=2 mode, the current phases of rungs 212A-212H are 0, 90, 180, 270, 0, 90, 180, and 270 degrees, respectively. Consequently, the phases are the same as the phases for the uniform mode of a four-rung birdcage coil, and thus, the N=2 mode is a uniform mode.

Figure 5:
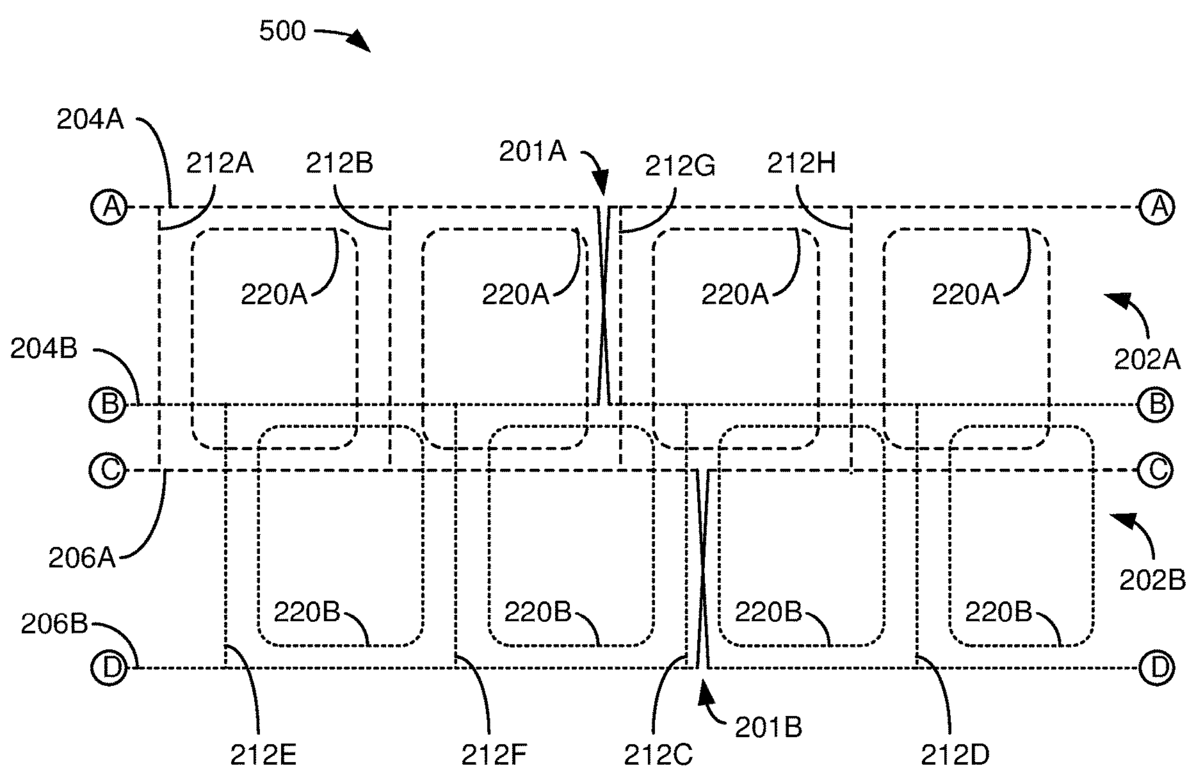
FIG. 5 illustrates a 2D view of some embodiments of a two-turn, eight-rung, two-row MT birdcage coil in which the two rows of meshes are offset in the horizontal direction.

As depicted in FIGS. 4A and 4B, the first row of meshes 220A are substantially aligned in the horizontal direction with the second row of meshes 220B. However, other configurations are also acceptable. For example, FIG. 5 illustrates a 2D view of some embodiments of an eight-rung, two-row MT birdcage coil 500 with two turns in which the two rows of meshes are offset in the horizontal direction (e.g., by approximately 25%). Despite this offset, MT birdcage coil 500 provides substantially similar magnetic field characteristics and performance to that of MT birdcage coil 400 of FIGS. 4A and 4B.

All shapes of the first row of meshes 220A and the second row of meshes 220B of FIGS. 4A, 4B, and 5 are substantially rectangular. A reason for this consistency is that each of the crossovers 201A and 201B is substantially aligned with a corresponding rung, although depicted as slightly offset from each other in FIGS. 4A, 4B, and 5 for clarity of illustration. However, from a practical perspective, some mesh shapes can be very different from rectangular shapes and still perform in a similar manner.

Figure 6:
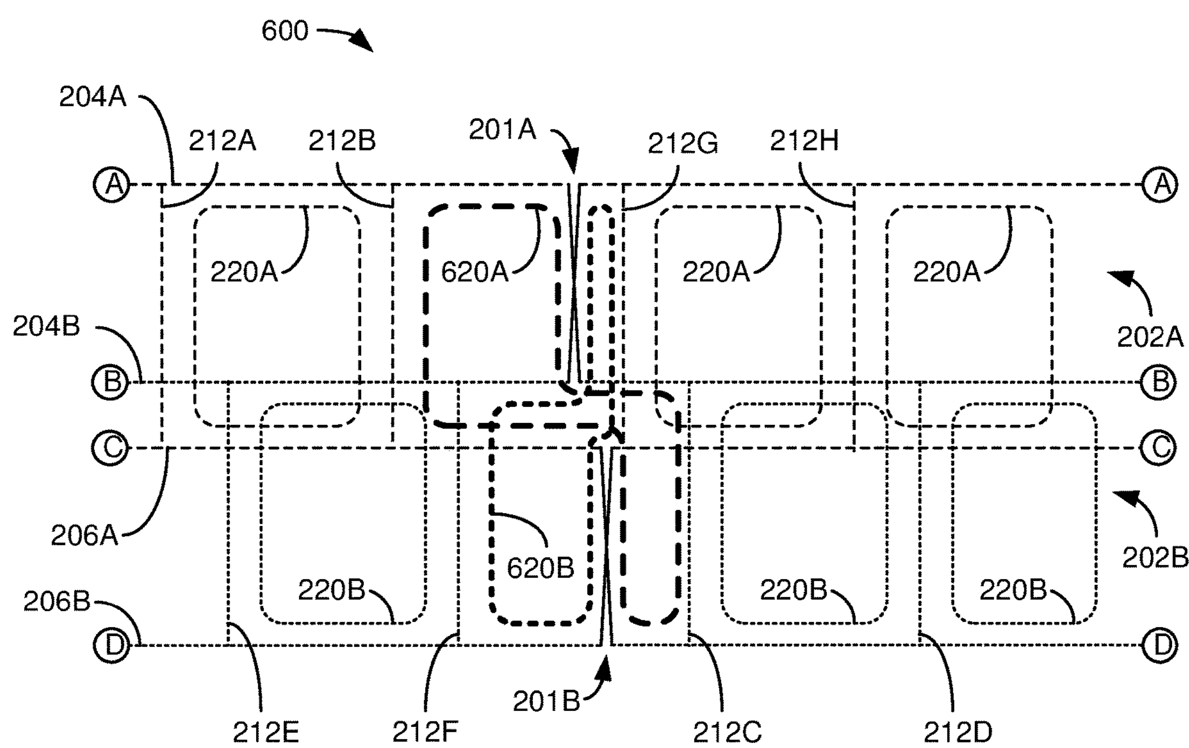
FIG. 6 illustrates a 2D view of some embodiments of a two-turn, eight-rung, two-row MT birdcage coil having at least two non-rectangular meshes.

FIG. 6 illustrates a 2D view of some embodiments of a two-turn, eight-rung, two-row MT birdcage coil 600 having at least two non-rectangular meshes, indicated therein as mesh 620A in the first row of meshes 220A and mesh 620B in the second row of meshes 220B. Compared to the rectangular mesh approaches of FIGS. 4A, 4B, and 5, the crossovers 201A and 201B of MT birdcage coil 600 between turns of the same row do not substantially align with a rung, but are located somewhere between two rungs. For example, crossover 201A is located at an intermediate position between rungs 212B and 212G, while crossover 201B is located at another intermediate position between rungs 212F and 212C, resulting in meshes 620A and 620B being non-rectangular. Remaining meshes 220A and 220B remain rectangular.

However, from an operational perspective, the effective shapes of meshes 620A and 620B may remain functionally rectangular. In some embodiments, in the uniform mode (e.g., N=2 and 720 degrees), the phase difference between meshes 620A and 620B is 360 degrees. As long as the segments of each crossover 201A and 201B within the same row are very close to, or are substantially on top of, each other (e.g., as shown in FIG. 6), the B 1 fields from those segments cancel. For example, in the embodiments of FIG. 6, the $B_1$ fields of the segments of crossover 201A cancel, as do the $B_1$ fields of the segments of crossover 201B, due to the 360-degree phase difference and the opposing directions of those $B_1$ fields. As a result of these cancelations, the associated portions of meshes 620A and 620B effectively disappear, resulting in meshes 620A and 620B exhibiting the characteristics of two rectangular meshes of different rows that are offset from each other. Consequently, either a rung position or a non-rung position can be chosen for either or both crossovers 201A and 201B to transit from one turn to another turn of the same conductive ring 202A and/or 202B.

Figure 7:
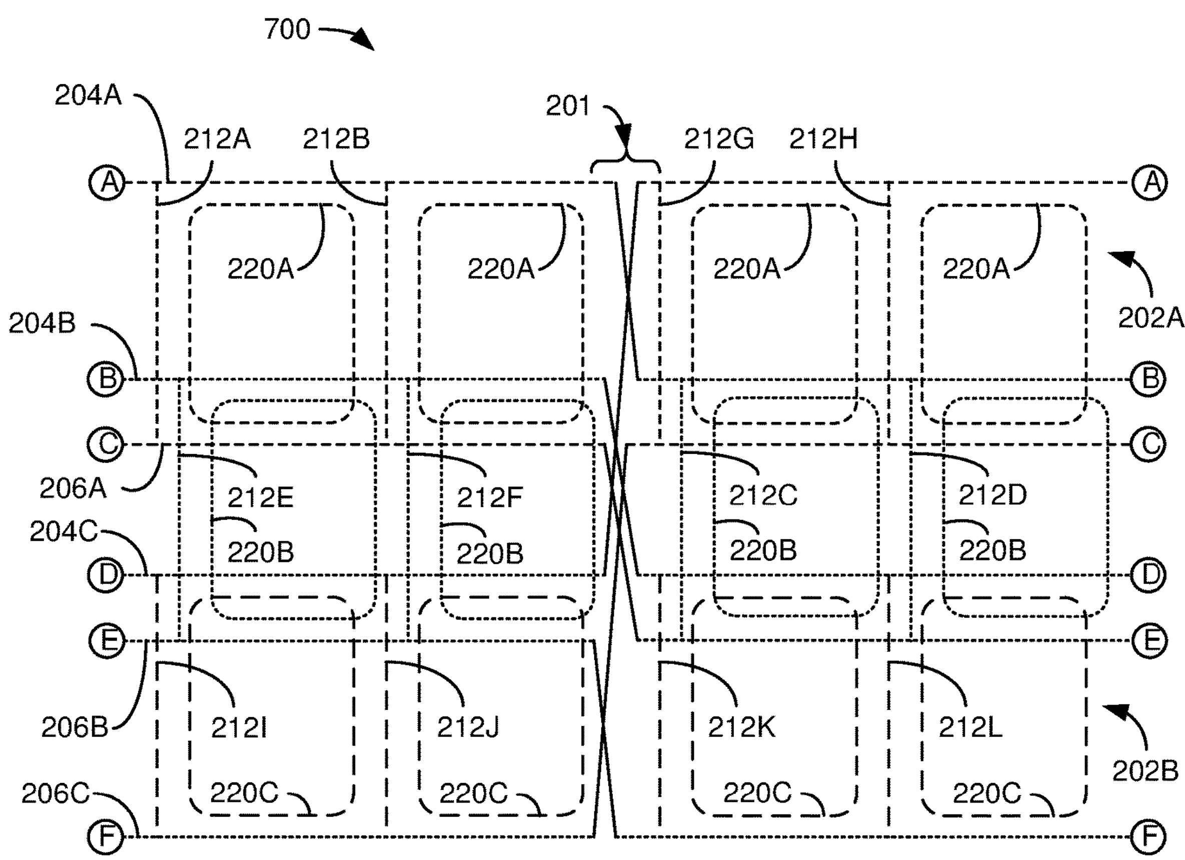
FIG. 7 illustrates a 2D view of some embodiments of a three-turn, three-row MT birdcage coil.

While the previous embodiments address one-row and two-row MT birdcage coils, FIG. 7 illustrates a 2D view of some embodiments of a three-turn, three-row MT birdcage coil 700, in which there is no lateral offset between rows. In the embodiments of FIG. 7, MT birdcage coil 700 has a first conductive ring 202A with a first turn 204A, a second turn 204B, and a third turn 204C, as well as a second conductive ring 202B with a first turn 206A, a second turn 206B, and a third turn 206C. Further, joint points are designated in FIG. 7 as A, B, C, D, E, and F. As depicted in FIG. 7, first conductive ring 202A, starting from left-hand point A, transitions through points B and D before returning to point A by way of turns 204A, 204B, and 204C, in order. Similarly, second conductive ring 202B, starting from left-hand point C, transitions through points E and F before returning to point C by way of turns 206A, 206B, and 206C, in order. In these embodiments, all crossovers 201 substantially align, thus providing a first row of meshes 220A, a second row of meshes 220B and a third row of meshes 220C that horizontally align with each other, as created by conductive rings 202A and 202B in conjunction with rungs 212A-212H, as well as rungs 212I, 212J, 212K, and 212L. In other embodiments, the rungs 212A-212L and crossovers 201 may be arranged such that the meshes 220A, 220B, and 220C are offset from each other (e.g., in a manner similar to MT birdcage coil 500 of FIG. 5), or such that one or more of meshes 220A, 220B, and 220C are non-rectangular (e.g., as shown in the MT birdcage coil 600 of FIG. 6). Further, even more complicated configurations, such as the use of four or more rows, and more meshes per row, may be achieved by applying the same principles used in the two-row and three-row cases discussed above. More generally, for an N-row MT birdcage coil, where N is an integer number greater than 1, the number of turns for each conductive ring may be equal to the number of rows. In the special case of MT birdcage coil 300 of FIGS. 3A and 3B, in which the number of rows is one, the number of turns of at least one conductive ring (e.g., two turns 204A and 204B for conductive ring 202A) may be unequal to the number of rows.

In some embodiments, different rows of an MT birdcage coil can have different numbers of rungs. For example, a first row of meshes 220A may have eight rungs, and a second row of meshes 220B may have twelve rungs for a two-turn, two-row MT birdcage coil. Such embodiments may be useful when different mesh sizes are needed for different rows. Further, in some embodiments within the same row of meshes, a width of at least one mesh may be different than at least one other mesh. Such embodiments may be important for providing mechanical openings through the larger meshes. For example, such openings may be used for head coils, for which you may want larger openings for the eyes, mouth, ears, and so on to reduce potentially claustrophobic conditions or otherwise enhance patient comfort. Further, the length of at least one row of meshes may be different from the length of at least one other mesh.

Multi-turn, multi-row (MTMR) birdcage coils, such as those discussed above, also may be configured in a high-pass mode (e.g., by installing capacitors in the conductive end rings between each adjacent pair of conductive rungs), a low-pass mode (e.g., by installing capacitors in one or both of the conductive rungs), a band-pass mode (e.g., by installing capacitors each of the conductive rungs and in the conductive end rings between each adjacent pair of conductive rungs), and even degenerate mode, where each mesh can be used as a loop coil and possesses significant isolation from all other meshes. The use of such embodiments may be directed to a variety of use cases or applications for MRI systems.

For example, in some embodiments, an MTMR birdcage coil may be configured as a traditional Tx coil, such as a WBC or a local Tx/Rx coil. In some embodiments, a single-row MT birdcage coil (e.g., the MT birdcage coils 100, 200, and 300 of FIGS. 1, 2A, 2B, 3A, and 3B), as described above, may be similarly configured. In such embodiments, the MTMR birdcage coil may possess features that can be used for $B_1$ field optimization. For example, overlapping between adjacent rows of meshes and the lengths of each row of meshes may be employed to optimize the $B_1$ profile along the $B_0$ direction. The number of rungs of different rows may also be different for further $B_1$ field optimization. In the case of a single-row MT birdcage coil, a higher Q and an expanded tuning range may be achieved, as discussed above.

In other embodiments, an MTMR birdcage coil may be used in the degenerate mode (e.g., for use as an Rx array coil in Rx mode). A Tx coil function can be realized from a WBC or another local transmitter. When the MTMR birdcage coil is in degenerate mode, each mesh may act like an independent loop coil and may thus provide excellent isolation from all other meshes. This feature may result in high Q for each mesh/channel, thus resulting in a high signal-to-noise ratio (SNR) for the Rx array coil. Such embodiments may be suitable for many cylindrical-like anatomies, such as the head, knee, wrist, leg, arm, etc. of a patient. As mentioned earlier, the row lengths and the number of meshes in each row need not be the same for each row.

Figure 8:
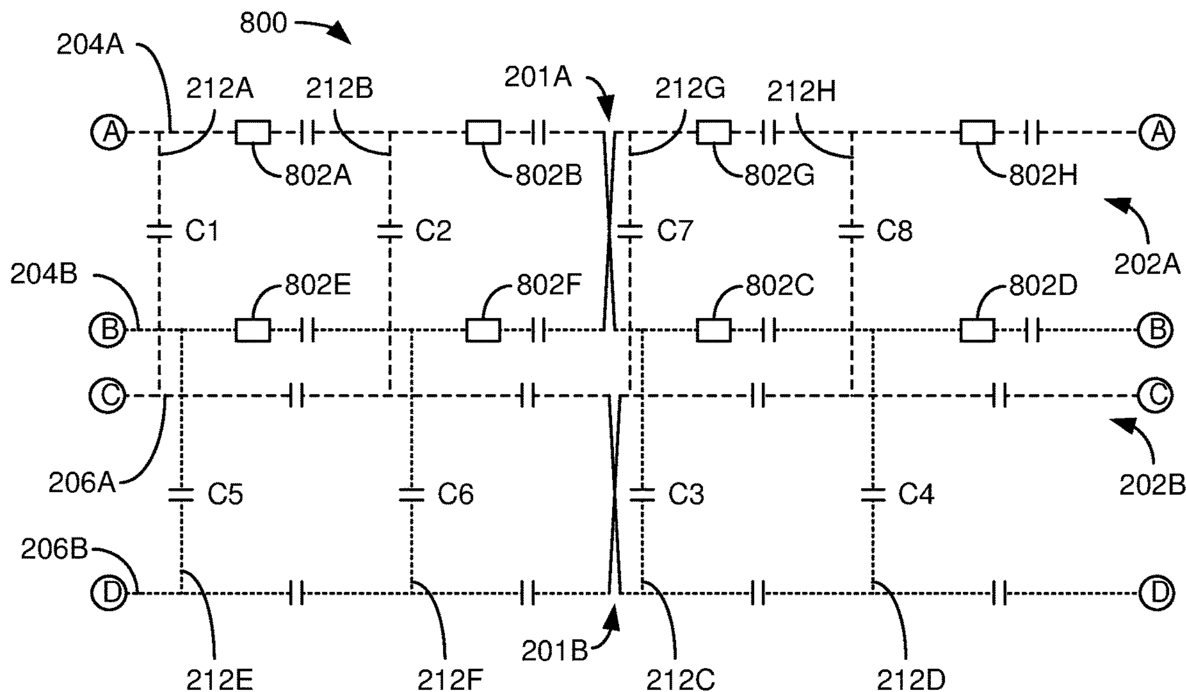
FIG. 8 illustrates a 2D view of some embodiments of the MT birdcage coil of FIGS. 4A and 4B in which all feed boards are positioned on the same ring.

FIG. 8 illustrates a 2D view of some embodiments of an MT birdcage coil 800 (e.g., patterned according to the MT birdcage coil 400 of FIGS. 4A and 4B) in which all feed boards 802A-802G are positioned on the same conductive ring 202A. As employed herein, a channel feed board (or feed circuit) may be a circuit coupled to a coil or loop (e.g., a mesh of an MT birdcage coil) to drive the loop with a transmission signal and to couple with the loop to receive signals from a patient anatomy. In some embodiments, a feed circuit may include an impedance-matching and decoupling circuit, a preamplifier circuit, a balun (e.g., a device that facilitates interfacing of balanced and unbalanced lines without disturbing the impedance arrangement of either line), and/or other electrical circuits or components. In addition, each conductive rung 212A-212H may include a corresponding capacitor C1-C8, respectively. Moreover, each segment of turns 204A and 204B of conductive ring 202A and of turns 206A and 206B of conductive ring 202B may include a corresponding capacitor between each adjacent pair of rungs, as depicted in FIG. 8. With the capacitors in such a configuration, the MT birdcage coil 800 may be operated in a band-pass mode.

Figure 9:
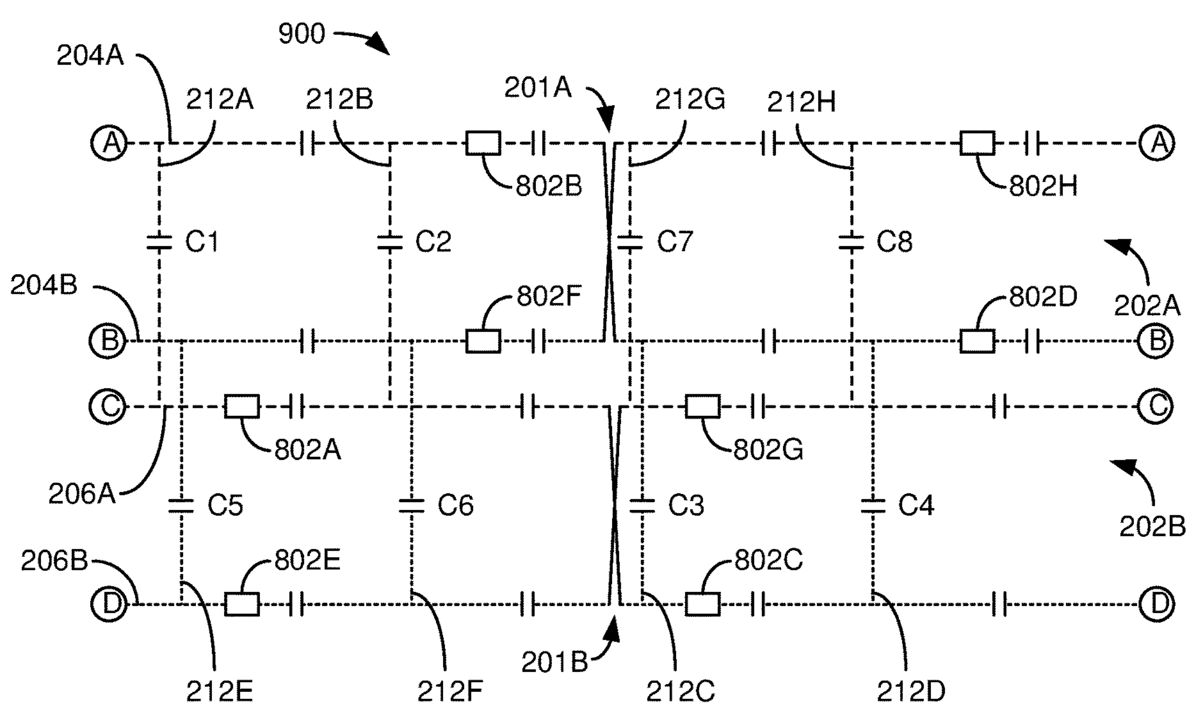
FIG. 9 illustrates a 2D view of some embodiments of the MT birdcage coil of FIGS. 4A and 4B in which feed boards for adjacent channels are located on different rings.

FIG. 9 illustrates a 2D view of some embodiments of an MT birdcage coil 900 (e.g., patterned according to the MT birdcage coil 400 of FIGS. 4A and 4B) in which feed boards for adjacent channels are located on different rings. As illustrated in FIG. 9, feed boards 802A and 802E are located in turns 206A and 206B, respectively, of the second conductive ring 202B; feed boards 802B and 802F are located in turns 204A and 204B, respectively, of the first conductive ring 202A; feed boards 802G and 802C are located in turns 206A and 206B, respectively, of the second conductive ring 202B; and feed boards 802H and 802D are located in turns 204A and 204B, respectively, of the first conductive ring 202A. Further, in a manner similar to that of the MT birdcage coil 800 of FIG. 8, each conductive rung 212A-212H may include a corresponding capacitor C1-C8, respectively, and each segment of turns 204A and 204B of conductive ring 202A and of turns 206A and 206B of conductive ring 202B may include a corresponding capacitor between each adjacent pair of rungs. Thus, the MT birdcage coil 900 may be operated in a band-pass mode.

In other embodiments, an MTMR birdcage coil may be used as an Rx array coil in Rx mode and configured as a Tx coil in Tx mode. A potential advantage of such embodiments is that only a single layer of coil, as may be present in an MTMR birdcage coil, may be used to achieve both Tx and Rx functions. In such embodiments, several different sub-embodiments related to how the MTMR birdcage coil is configured to operate as a Tx coil are described below.

Figure 10:
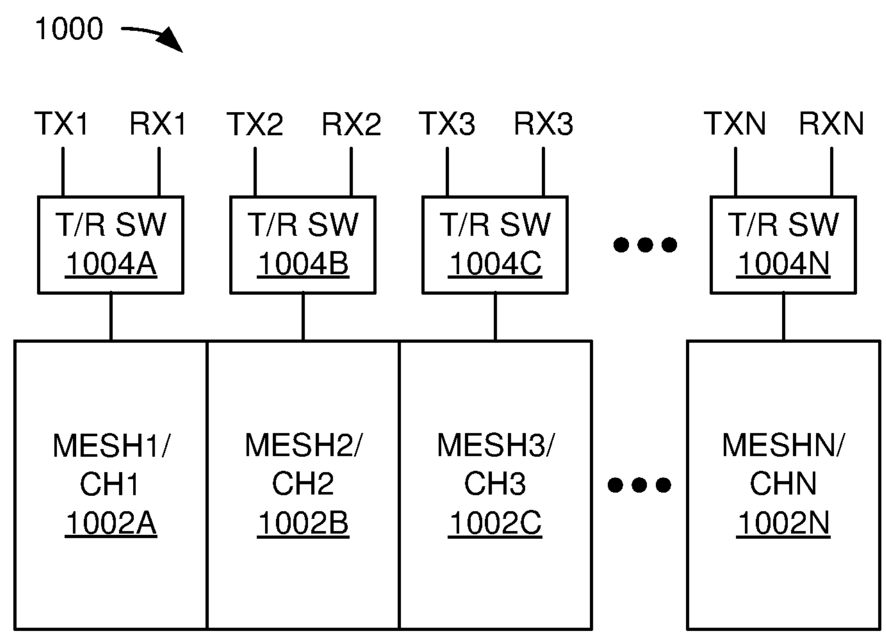
FIG. 10 illustrates a 2D view of some embodiments of a multi-turn, multi-row (MTMR) birdcage coil in which the coil is configured for parallel transmission (pTx).

For example, FIG. 10 illustrates a 2D view of some embodiments of an MTMR birdcage coil 1000 in which the coil is configured to use each mesh/channel 1002A-1002N (e.g., N different meshes) as an independent Tx channel, in which each mesh 1002A-1002N may be driven by its own RF power amplifier (RFPA). As depicted in FIG. 10, each mesh/channel 1002A, 1002B, 1002C, . . . , and 1002N is coupled to a transmit/receive (T/R) switch 1004A, 1004B, 1004C, . . . , and 1004N, respectively. In some embodiments, the RFPA and/or associated T/R switch 1004A-1004N for a mesh/channel 1002A-1002N may reside on a corresponding feed board, as described above in connection with FIGS. 8 and 9. Each T/R switch 1004A-1004N includes a transmission input TX1-TXN (e.g., to receive a signal to drive the associated mesh/channel) and a reception output RX1-RXN (to provide a signal received via the associated mesh/channel). Such a configuration, called parallel transmission (pTx), is possible because each mesh and associated Tx channel provides excellent isolation relative to the other meshes. Such embodiments may be used in high-field MRI, such as 7T and above, but may also be used in lower fields as well.

Figure 11:
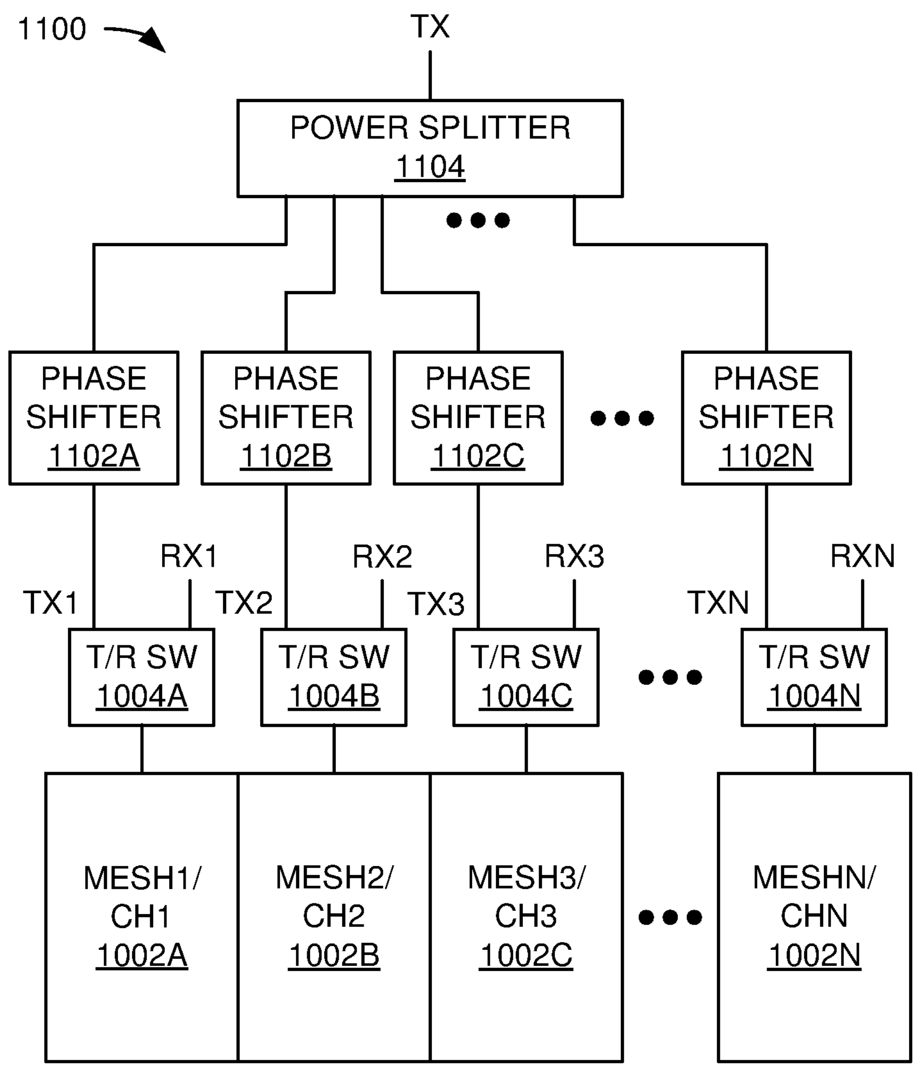
FIG. 11 illustrates a 2D view of some embodiments of an MTMR birdcage coil in which a power splitter and phase shifters drive the transmit (Tx) channels.

FIG. 11 illustrates a 2D view of some embodiments of an MTMR birdcage coil 1100 in which a power splitter 1104 and phase shifters 1102A, 1102B, 1102C, . . . , and 1102N drive the transmit (Tx) channels TX1-TXN. As illustrated in FIG. 11, MTMR birdcage coil 1100 includes T/R switches 1004A-1004N coupled to meshes/channels 1002A-1002N, as discussed above in relation to FIG. 10. In addition, the transmission input TX1-TXN of each T/R switch 1004A-1004N is driven by an output of a corresponding phase shifter 1102A-1102N. In some embodiments, the phase shifter 1102A-1102N and/or associated T/R switch 1004A-1004N for a mesh/channel 1002A-1002N may reside on a corresponding feed board, as discussed above in relation to FIGS. 8 and 9. In turn, each phase shifter 1102A-1102N is driven by a single transmission signal TX by way of a power splitter 1104. Consequently, in Tx mode, each mesh/channel 1002A-1002N may have its own Tx magnitude and phase. Such embodiments may be suitable for a single Tx/Rx array coil. An advantage of these embodiments is reduced coupling between the Tx coil and Rx coil (e.g., high SNR and more Tx efficiency) due to the one layer structure being employed. Also, such embodiments provide good performance for low-field (e.g., <1 T) to high-field (e.g., 7 T or more) applications.

Figure 12:
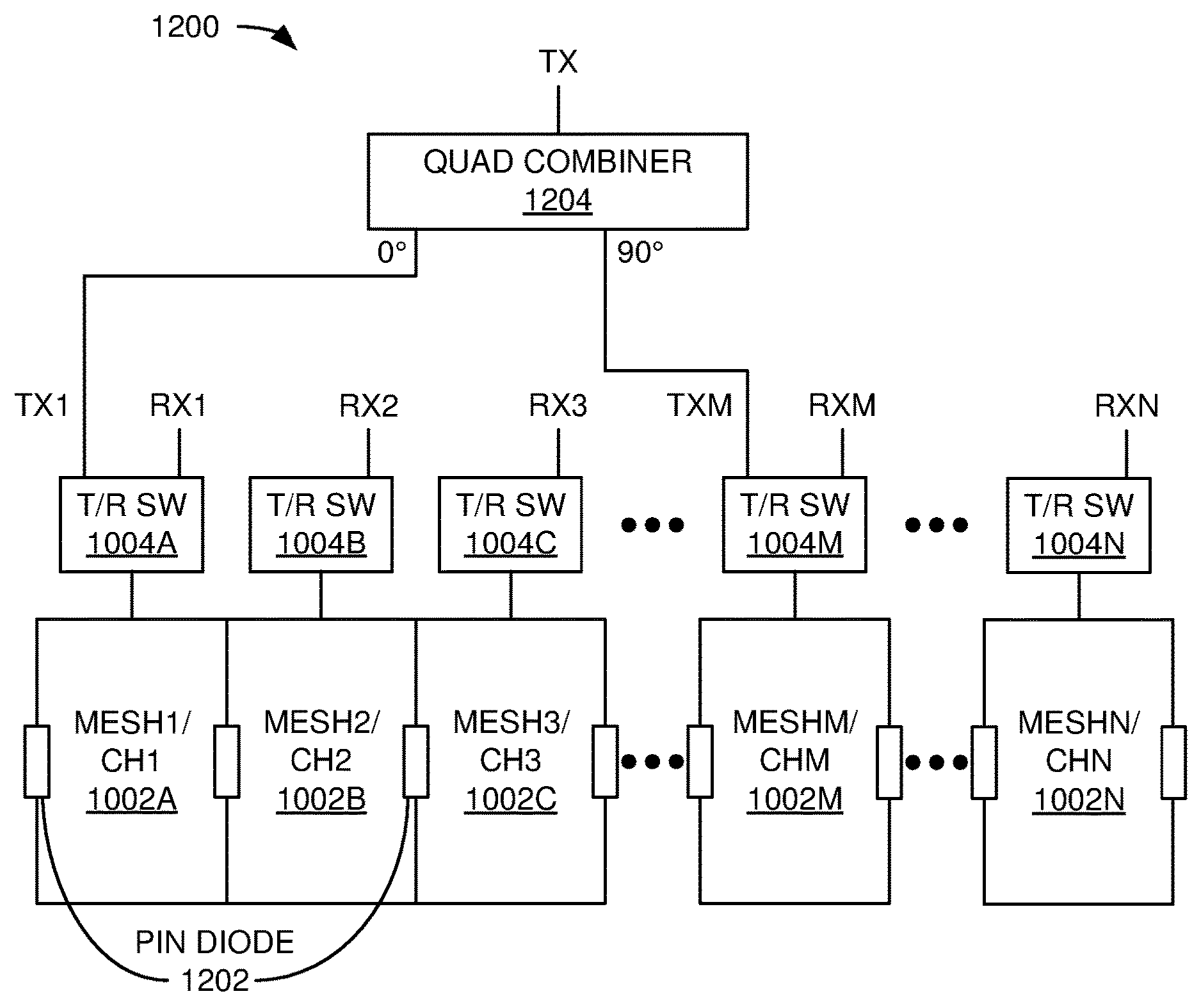
FIG. 12 illustrates a 2D view of some embodiments of an MTMR birdcage coil in which a quadrature combiner drives the Tx channels.

FIG. 12 illustrates a 2D view of some embodiments of an MTMR birdcage coil 1200 in which a quadrature combiner 1204 drives two Tx channels. As illustrated in FIG. 12, MTMR birdcage coil 1200 includes T/R switches 1004A-1004N coupled to meshes/channels 1002A-1002N, as discussed above in relation to FIG. 10. In some embodiments, a T/R switch 1004A-1004N for a mesh/channel 1002A-1002N may reside on a corresponding feed board, as described above in conjunction with FIGS. 8 and 9. In addition, two transmission inputs, TX1 and TXM of corresponding T/R switches 1004A and 1004M, are each driven by a corresponding output of the quadrature combiner 1204. As depicted in FIG. 12, the transmission signal TX drives an output of the quadrature combiner 1204, and each output of the quadrature combiner 1204 drives a corresponding input TX1 and TXM of the T/R switches 1004A and 1004M. In some embodiments, a first T/R switch of the plurality of T/R switches (e.g., T/R switch 1004A coupled to MESH1/CH1 1002A) is driven by an output signal of the quadrature combiner 1204 at a first phase (e.g., 0 degrees), and a second T/R switch of the plurality of T/R switches (e.g., T/R switch 1004M coupled to MESHM/CHM 1002M) is driven by an output signal of the quadrature combiner 1204 at a second phase shifted from the first phase by 90 degrees (e.g., 90 degrees). Further, in some embodiments, the number of meshes/channels from MESH1/CH1 to MESH(M−1)/CH(M−1) is equal to the number of meshes/channels MESHM/CHM to MESHN/CHN. In some embodiments, the MTMR birdcage coil 1200 may be configured in the degenerate mode as an Rx array coil in Rx mode and configured in high-pass, low-pass, or band-pass mode as a Tx coil in Tx mode. In some embodiments, each conductive rung between each mesh/channel 1002A-1002N may include a PIN (p-type, intrinsic, n-type) diode 1202, each of which may switch states when the MTMR birdcage coil 1200 switches between the degenerate (Rx) mode and the high-pass, low-pass, or band-pass (Tx) mode. While the PIN diodes 1202 are only shown on the conductive rungs, the PIN diodes 1202 may also be located on one or more turns of each conductive ring.

For each of the embodiments discussed above, only components or blocks relevant to the discussion regarding each embodiment are illustrated for simplicity. Consequently, other circuits or components, such as decoupling points, break point capacitors, preamplifiers, RF chokes, connectors, cables, etc. are not shown or discussed, although such circuits and components may be included to render functional each of the MT birdcage coils described above.

Figure 13:
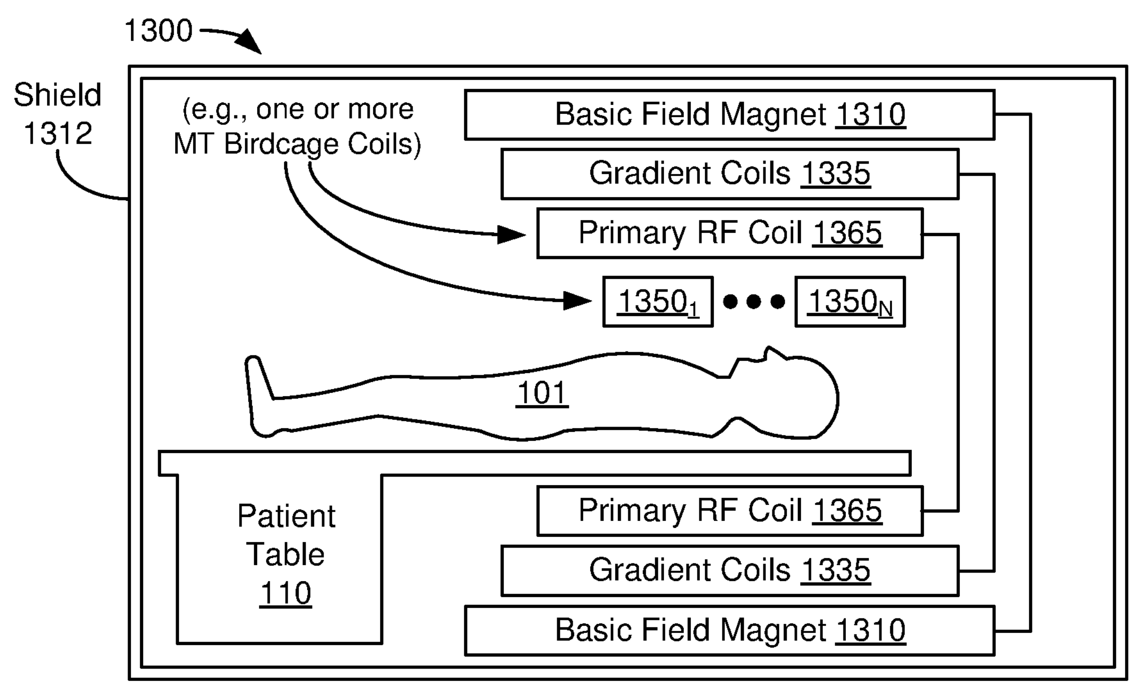
FIG. 13 illustrates a high-level view of some embodiments of a magnetic resonance imaging (MRI) system including a MT birdcage coil.

With reference to FIG. 13, a high-level view of some embodiments of an MRI system 1300 according to aspects of the present disclosure is provided.

MRI system 1300 uses RF antennas, in the form of coils or coil elements, to transmit and receive RF pulses within a magnetic field (e.g., generated by a basic field magnet 1310). The received pulses are used to create images of tissue of a patient 101 (e.g., positioned on a patient table 110) to aid in the diagnosis of medical conditions. Generally, a shield 1312 may substantially contain the generated magnetic fields and RF pulses from the surrounding environment of MRI system 1300.

In some examples, MRI system 1300 may incorporate a whole-body coil (WBC) (e.g., primary RF coil 1365, operating in conjunction with gradient coils 1335) as a transmission device. However, the WBC may sometimes be used as a receive device. The WBC is intended for imaging large portions of the body. In lieu of the WBC, a smaller local MRI coil or RF antenna 1350 (e.g., one or more local antennas $\mathbf{1350}_1$, $\mathbf{1350}_2$ . . . $\mathbf{1350}_N$) may be employed to receive RF pulses from the anatomy being imaged. In some embodiments, one or more MT birdcage coils (e.g., a single-row MT birdcage coil as described above (e.g., FIGS. 1, 2A, 2B, 3A, and 3B) or MTMR birdcage coils as described above (e.g., FIGS. 4A, 4B, and 5-12)) may serve as one or more of the primary RF coil 1365 and/or the one or more local antennas $\mathbf{1350}_1$-$\mathbf{1350}_N$.

Figure 14:
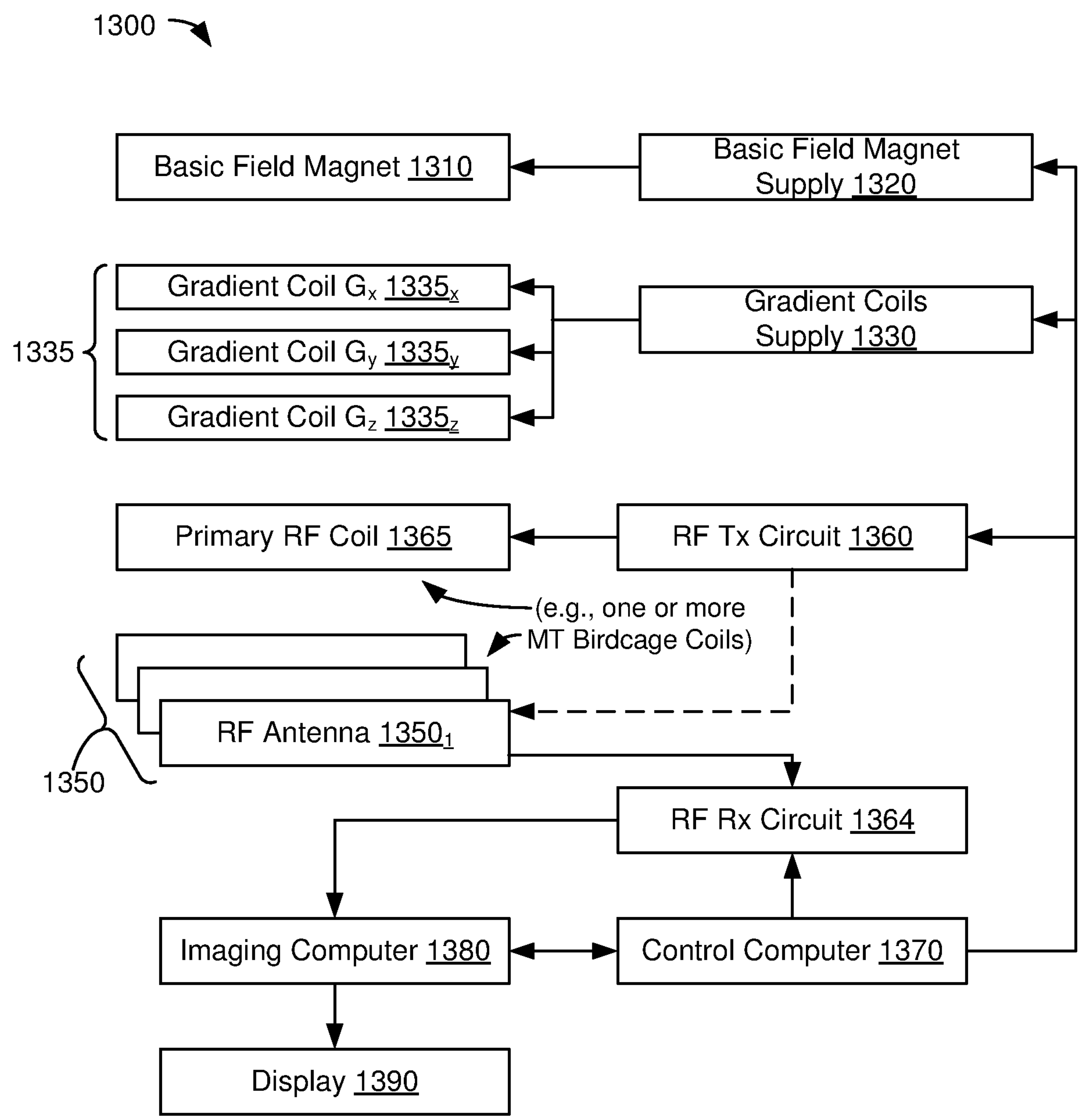
FIG. 14 illustrates a block diagram of some embodiments of an MRI system including a MT birdcage coil.

With reference to FIG. 14, a block diagram of some embodiments of the MRI system 1300 that can be configured with example MRI RF coils, coil channels, coil elements, coil arrays, or circuitry according to one or more embodiments described herein is provided.

The MRI system 1300 includes the one or more basic field magnets 1310 and a basic field magnet supply 1320. Ideally, the basic field magnet(s) 1310 produce a uniform $B_0$ field. However, in practice, the $B_0$ field may not be uniform, and may vary over an object being imaged by the MRI system 1300. The MRI system 1300 can include gradient coils 1335 configured to emit gradient magnetic fields like $G_x$ (e.g., via an associated gradient coil $\mathbf{1335}_x$), $G_y$ (e.g., via an associated gradient coil $\mathbf{1335}_y$), and $G_z$ (e.g., via an associated gradient coil $\mathbf{1335}_z$). The gradient coils 1335 can be controlled, at least in part, by a gradient coils supply 1330. In some examples, the timing, strength, and orientation of the gradient magnetic fields can be controlled, and thus selectively adapted during an MRI procedure.

The MRI system 1300 can include a primary RF coil 1365 configured to generate RF pulses. The primary RF coil 1365 can be a WBC. The primary RF coil 1365 can be, for example, an MT birdcage coil (e.g., a single-row MT birdcage coil as described above (e.g., FIGS. 1, 2A, 2B, 3A, and 3B) or an MTMR birdcage coil as described above (e.g., FIGS. 4A, 4B, and 5-12)). The primary RF coil 1365 can be controlled, at least in part, by one or more RF transmission circuits 1360. The RF transmission circuit(s) 1360 can provide a signal to the primary RF coil 1365.

The MRI system 1300 can include a set of RF antennas 1350 (e.g., one or more RF antennas $\mathbf{1350}_1$-$\mathbf{1350}_N$, which can be as described herein). The RF antennas 1350 can be configured to generate RF pulses and/or to receive resulting magnetic resonance signals from an object to which the RF pulses are directed. An RF antenna 1350 configured solely to generate RF pulses can be referred to herein as a Tx antenna (or coil or coil array), while an RF antenna 1350 configured solely to receive resulting magnetic resonance signals from an object to which the RF pulses are directed can be referred to herein as an Rx antenna (or coil or coil array). An RF antenna 1350 configured to both generate RF pulses and receive resulting magnetic resonance signals can be referred to herein as a Tx/Rx antenna (or coil or coil array). Unless otherwise indicated, antennas, coils, and coil arrays discussed herein can, in various embodiments, be any of a Tx antenna/coil/coil array, an Rx antenna/coil/coil array, or a Tx/Rx antenna/coil/coil array.

In some embodiments, the RF antennas 1350 can be configured to inductively couple with the primary RF coil 1365 and generate RF pulses and to receive resulting magnetic resonance signals from an object to which the RF pulses are directed. In other embodiments, the RF antennas 1350 can be electrically coupled to a power source (e.g., the RF transmission circuit(s) 1360) that can drive the RF antennas 1350 to generate RF pulses, and the RF antennas 1350 can also be configured to receive resulting magnetic resonance signals from an object to which the RF pulses are directed. In one embodiment, one or more members of the set of RF antennas 1350 can be fabricated from flexible coaxial cable or other conductive material. The set of RF antennas 1350 can be connected with one or more RF receive circuits 1364. In some embodiments, one or more members of the set of RF antennas 1350 are or form a single-row MT birdcage coil as described above (e.g., FIGS. 1, 2A, 2B, 3A, and 3B) or an MTMR birdcage coil as described above (e.g., FIGS. 4A, 4B, and 5-12). In addition, the RF transmission circuit(s) 1360 and/or RF receive circuits 1364 may be included in one or more feed boards, as described above in connection with FIGS. 8 and 9, and may include one or more T/R switches and/or other components, as discussed above with respect to FIGS. 10-12.

The gradient coils supply 1330 and the RF transmission circuit(s) 1360 can be controlled, at least in part, by a control computer 1370. The magnetic resonance signals received from the set of RF antennas 1350 can be employed to generate an image, and thus can be subject to a transformation process like a two-dimensional fast Fourier transform (FFT) that generates pixelated image data. The transformation can be performed by an image computer 1380 or other similar processing device. The image data can then be shown on a display 1390. The RF receive circuit(s) 1364 can be connected with the control computer 1370 or the image computer 1380.

While FIG. 14 illustrates an example MRI system 1300 that includes various components connected in various ways, it is to be appreciated that other MRI systems can include other components connected in other ways, and can be employed in connection with various embodiments discussed herein.

In one embodiment, the MRI system 1300 includes the control computer 1370. In one example, a member of the set of RF antennas 1350 can be individually controllable by the control computer 1370. The control computer 1370 can provide a DC bias current, or control a DC bias control circuit to control the application of a DC bias current, to PIN diodes (e.g., PIN diodes 1202 of FIG. 12) that can be part of the RF antennas 1350 and/or the primary RF coil 1365.

In some embodiments, one or more members of the set of RF antennas 1350 can be or correspond to any example single-row MT birdcage coil as described above (e.g., FIGS. 1, 2A, 2B, 3A, and 3B) or any example MTMR birdcage coil as described above (e.g., FIGS. 4A, 4B, and 5-12). Further, in some of such embodiments, the MRI system 1300 employs the degenerate birdcage coil for pTx. An MRI system can include, among other components, a controller (e.g., the control computer 1370), which can provide any of the aforementioned coils with a current, a voltage, or a control signal.

In an Example 1, an MT birdcage MRI RF coil includes a first conductive ring, a second conductive ring, and a plurality of conductive rungs. Each of the plurality of conductive rungs includes a first end coupled to the first conductive ring, and a second end coupled to the second conductive ring. At least one of the first conductive ring and the second conductive ring includes more than one turn. The first conductive ring, the second conductive ring, and the plurality of conductive rungs form a plurality of meshes.

In an Example 2 that depends on Example 1, the plurality of conductive rungs includes at least eight rungs.

In an Example 3 that depends on Example 1, the first conductive ring includes two revolutions and the second conductive ring includes one turn, and the plurality of meshes forms a single row of meshes.

In an Example 4 that depends on Example 1, each of the first conductive ring and the second conductive ring includes two turns.

In an Example 5 that depends on Example 4, the plurality of meshes forms at least a first row of meshes and a second row of meshes.

In an Example 6 that depends on Example 5, a first number of meshes of the first row of meshes is not equal to a second number of meshes of the second row of meshes.

In an Example 7 that depends on Example 5, a size of a mesh of the first row of meshes is not equal to a size of at least one other mesh of the first row of meshes.

In an Example 8 that depends on Example 5, the first row of meshes is laterally offset from the second row of meshes.

In an Example 9 that depends on Example 1, a number of turns of the first conductive ring is equal to a number of turns of the second conductive ring.

In an Example 10, an MT birdcage MRI RF coil includes a first conductive ring, a second conductive ring, and a plurality of conductive rungs. Each of the plurality of conductive rungs includes a first end coupled to the first conductive ring, and a second end coupled to the second conductive ring. Each of the first conductive ring and the second conductive ring includes N turns. The first conductive ring, the second conductive ring, and the plurality of conductive rungs form N rows of meshes. N is an integer greater than 1.

In an Example 11 that depends on Example 10, a number of meshes of at least one of the N rows of meshes is different from a number of meshes of at least one other of the N rows of meshes.

In an Example 12 that depends on Example 10, within at least one of the N rows of meshes, a size of a mesh is not equal to a size of at least one other mesh.

In an Example 13 that depends on any one of Example 10, a length of at least one of the N rows of meshes is not equal to a length of at least one other of the N rows of meshes.

In an Example 14, an MT birdcage MRI RF coil includes a first conductive ring, a second conductive ring, a plurality of conductive rungs, and a plurality of feed circuits. At least one of the first conductive ring and the second conductive ring includes at least two turns. Each of the plurality of conductive rungs couples the first conductive ring to the second conductive ring to form a plurality of meshes organized as at least one row of meshes. The plurality of feed circuits are connected to at least one of the first conductive ring and the second conductive ring, and each of the plurality of feed circuits is coupled to a corresponding one of the plurality of meshes.

In an Example 15 that depends on Example 14, the plurality of feed circuits includes a first plurality of feed circuits and a second plurality of feed circuits. Each of the first plurality of feed circuits is connected to a first turn of the first conductive ring. Each of the second plurality of feed circuits is connected to a second turn of the first conductive ring.

In an Example 16 that depends on Example 14, the plurality of feed circuits includes a first plurality of feed circuits and a second plurality of feed circuits. Each of the first plurality of feed circuits is connected to the first conductive ring. Each of the second plurality of feed circuits is connected to the second conductive ring.

In an Example 17 that depends on Example 16, the first plurality of feed circuits includes a third plurality of feed circuits and a fourth plurality of feed circuits, and the second plurality of feed circuits includes a fifth plurality of feed circuits and a sixth plurality of feed circuits. Each of the third plurality of feed circuits is connected to a first turn of the first conductive ring. Each of the fourth plurality of feed circuits is connected to a second turn of the first conductive ring. Each of the fifth plurality of feed circuits is connected to a first turn of the second conductive ring. Each of the sixth plurality of feed circuits is connected to a second turn of the second conductive ring.

In an Example 18 that depends on Example 14, the MT birdcage MRI RF coil further includes a plurality of transmit/receive switches. Each of the plurality of transmit/receive switches includes a transmission input and a reception output to a corresponding one of the plurality of meshes.

In an Example 19 that depends on Example 18, the MT birdcage MRI RF coil further includes a plurality of phase shifters and a power splitter. Each of the plurality of phase shifters is coupled to the transmission input of a corresponding one of the plurality of transmit/receive switches. The power splitter couples a transmission signal to each of the plurality of phase shifters.

In an Example 20 that depends on Example 18, the MT birdcage MRI RF coil further includes a quadrature combiner configured to receive a transmission signal. The quadrature combiner includes a first output configured to provide the transmission signal to the transmission input of one of a first portion of the plurality of transmit/receive switches, and a second output configured to provide the transmission signal, phase-shifted by 90 degrees relative to the first output, to the transmission input of one of a second portion of the plurality of transmit/receive switches.

The following includes definitions of selected terms employed herein. The definitions include various examples or forms of components that fall within the scope of a term and that may be used for implementation. The examples are not intended to be limiting. Both singular and plural forms of terms may be within the definitions.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong. It will be further understood that terms (e.g., those defined in commonly used dictionaries) should be interpreted as having a meaning that is consistent with their meaning in the context of the relevant art and will not be interpreted in an idealized or overly formal sense unless expressly so defined herein.

In the above description, some components may be displayed in multiple figures carrying the same reference signs but may not be described multiple times in detail. A detailed description of a component may then apply to that component for all its occurrences.

The detailed descriptions presented herein may be presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on refer to actions and processes of a computer system, logic, processor, or similar electronic device that manipulates and transforms data represented as physical and/or electronic quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

What is claimed is:

1. A multi-turn (MT) birdcage magnetic resonance imaging (MRI) radio-frequency (RF) coil comprising:
- a first conductive ring and a second conductive ring; and
- a plurality of conductive rungs, each of the plurality of conductive rungs comprising:
  - a first end coupled to the first conductive ring; and
  - a second end coupled to the second conductive ring; and wherein:
- the first conductive ring is continuous in a closed path;
- the closed path has a plurality of turns individually surrounding an imaging volume of the MT birdcage MRI RF coil;
- the closed path has one or more crossovers at which the closed path crosses itself transitioning between turns; and
- the first conductive ring, the second conductive ring, and the plurality of conductive rungs form a plurality of meshes.

2. The MT birdcage MRI RF coil of claim 1, wherein the plurality of conductive rungs includes at least eight rungs.

3. The MT birdcage MRI RF coil of claim 1, wherein a number of turns of the first conductive ring is equal to a number of turns of the second conductive ring.

4. The MT birdcage MRI RF coil of claim 1, wherein the first conductive ring has a total number of turns that is different than a total number of turns of the second conductive ring.

5. The MT birdcage MRI RF coil of claim 4, wherein:
- the total number of turns of the first conductive ring is two;
- the total number of turns of the second conductive ring is one; and
- the plurality of meshes form a single row of meshes.

6. The MT birdcage MRI RF coil according to claim 1, wherein the one or more crossovers comprise a first crossover, wherein the plurality of turns comprise a first turn and a second turn that are spaced from each other and that individually extend circumferentially around the imaging volume from a first side of the first crossover to a second side of the first crossover, and wherein the first crossover has a first segment extending from an end of the first turn at the first side to an end of the second turn at the second side, and further has a second segment crossing and spaced from the first segment and extending from an end of the first turn at the second side to an end of the second turn at the first side.

7. A multi-turn (MT) birdcage magnetic resonance imaging (MRI) radio-frequency (RF) coil comprising:
- a first conductive ring and a second conductive ring; and
- a plurality of conductive rungs, each of the plurality of conductive rungs comprising:
  - a first end coupled to the first conductive ring; and
  - a second end coupled to the second conductive ring;

wherein:
- each of the first conductive ring and the second conductive ring is continuous, includes N turns individually surrounding an imaging volume of the MT birdcage MRI RF coil, and further includes a first crossover at which that conductive ring crosses itself transitioning between turns;
- the first conductive ring, the second conductive ring, and the plurality of conductive rungs form N rows of meshes; and
- N is an integer greater than 1.

8. The MT birdcage MRI RF coil of claim 7, wherein a number of meshes of at least one of the N rows of meshes is different from a number of meshes of at least one other of the N rows of meshes.

9. The MT birdcage MRI RF coil of claim 7, wherein, within at least one of the N rows of meshes, a size of a mesh is not equal to a size of at least one other mesh.

10. The MT birdcage MRI RF coil of claim 7, wherein a length of at least one of the N rows of meshes is not equal to a length of at least one other of the N rows of meshes.

11. The MT birdcage MRI RF coil according to claim 7, wherein the imaging volume is cylindrical with an imaging axis around which the first and second end rings individually extend circumferentially, wherein the N rows of meshes are laterally offset from each other along the imaging axis and form one or more pairs of neighboring rows along the imaging axis, and wherein the N turns of the first conductive ring comprise a turn for each of the pairs of neighboring rows and the turn is between the rows of that pair of neighboring rows along the imaging axis.

12. The MT birdcage MRI RF coil of claim 7, wherein the N turns of the first conductive ring comprise a first turn and a second turn, wherein the first crossover of the first conductive ring has a first crossover segment that extends from a first end of the first turn to a first end of the second turn, and further comprises a second crossover segment that extends from a second end of the first turn and that crosses the first crossover segment, and wherein the first turn, the second turn, the first crossover segment, and the second crossover segment are spaced from each other.

13. A multi-turn (MT) birdcage magnetic resonance imaging (MRI) radio-frequency (RF) coil, comprising:
- a first conductive ring and a second conductive ring, wherein the first conductive ring includes: at least two turns individually surrounding an imaging volume of the MT birdcage MRI RF coil; and a first crossover at which the first conductive ring crosses itself transitioning between turns;
- a plurality of conductive rungs, each of the plurality of conductive rungs coupling the first conductive ring to the second conductive ring to form a plurality of meshes organized as at least one row of meshes; and
- a plurality of feed circuits connected to at least one of the first conductive ring and the second conductive ring, each of the plurality of feed circuits being coupled to a corresponding one of the plurality of meshes.

14. The MT birdcage MRI RF coil of claim 13, wherein:
- the plurality of feed circuits comprises a first plurality of feed circuits and a second plurality of feed circuits;
- each of the first plurality of feed circuits is connected to a first turn of the first conductive ring; and
- each of the second plurality of feed circuits is connected to a second turn of the first conductive ring.

15. The MT birdcage MRI RF coil of claim 13, wherein:
- the plurality of feed circuits comprises a first plurality of feed circuits and a second plurality of feed circuits;
- each of the first plurality of feed circuits is connected to the first conductive ring; and
- each of the second plurality of feed circuits is connected to the second conductive ring.

16. The MT birdcage MRI RF coil of claim 13, further comprising:
- a plurality of transmit/receive switches, wherein each of the plurality of transmit/receive switches includes a transmission input and a reception output to a corresponding one of the plurality of meshes.

17. The MT birdcage MRI RF coil of claim 16, further comprising:
- a plurality of phase shifters, wherein each of the plurality of phase shifters is coupled to the transmission input of a corresponding one of the plurality of transmit/receive switches; and
- a power splitter coupling a transmission signal to each of the plurality of phase shifters.

18. The MT birdcage MRI RF coil of claim 16, further comprising:
- a quadrature combiner configured to receive a transmission signal, the quadrature combiner comprising:
  - a first output configured to provide the transmission signal to the transmission input of one of a first portion of the plurality of transmit/receive switches; and
  - a second output configured to provide the transmission signal, phase-shifted by 90 degrees relative to the first output, to the transmission input of one of a second portion of the plurality of transmit/receive switches.

19. The MT birdcage MRI RF coil according to claim 13, wherein the at least two turns of the first conductive ring include a first turn and a second turn, wherein the second conductive ring includes a third turn and a fourth turn and further includes a second crossover at which the second conductive ring crosses itself transitioning between turns, wherein the first, second, third, and fourth turns extend circumferentially around an imaging axis of the imaging volume and are laterally spaced from each other along the imaging axis.

20. The MT birdcage MRI RF coil according to claim 19, wherein the second turn is between the first and third turns along the imaging axis and the third turn is between the second and fourth turns along the imaging axis, wherein the plurality of conductive rungs are split amongst a first set of rungs and a second set of rungs, wherein the first set of rungs extend from the first turn to the third turn, and wherein the second set of rungs extend from the second turn to the fourth turn.

* * * * *